(12) United States Patent
Maki et al.

(10) Patent No.: US 8,466,596 B2
(45) Date of Patent: Jun. 18, 2013

(54) LAMINATED CORE

(75) Inventors: Kiyohisa Maki, Kitakyushu (JP);
Yusuke Hasuo, Kitakyushu (JP); Mei Arazoe, Kitakyushu (JP)

(73) Assignee: Mitsui High-Tec, Inc., Kitakyushu-shi, Fukuoka (JP)

( * ) Notice: Subject to any disclaimer, the term of this patent is extended or adjusted under 35 U.S.C. 154(b) by 15 days.

(21) Appl. No.: 13/256,362

(22) PCT Filed: Apr. 28, 2010

(86) PCT No.: PCT/JP2010/057597
§ 371 (c)(1),
(2), (4) Date: Sep. 13, 2011

(87) PCT Pub. No.: WO2010/131582
PCT Pub. Date: Nov. 18, 2010

(65) Prior Publication Data
US 2012/0019093 A1 Jan. 26, 2012

(30) Foreign Application Priority Data

May 15, 2009 (JP) .................................. 2009-118957
Mar. 10, 2010 (JP) .................................. 2010-053419

(51) Int. Cl.
*H02K 1/06* (2006.01)
(52) U.S. Cl.
USPC .............................. 310/216.009; 310/216.043
(58) Field of Classification Search
USPC .................... 310/216.008, 216.009, 216.011, 310/216.013, 216.041, 216.043, 216.058, 310/216.061, 216.089, 216.099, 216.135
See application file for complete search history.

(56) References Cited

U.S. PATENT DOCUMENTS

| 5,986,377 | A * | 11/1999 | Yamada et al. ......... 310/216.013 |
| 6,630,766 | B1 * | 10/2003 | Kirn et al. ..................... 310/418 |
| 6,919,665 | B2 * | 7/2005 | Murakami et al. ..... 310/216.043 |
| 8,106,561 | B2 * | 1/2012 | Myojin ................... 310/216.043 |
| 2003/0127938 | A1 * | 7/2003 | Shen et al. .................... 310/216 |
| 2005/0067912 | A1 * | 3/2005 | Murakami et al. ............ 310/216 |
| 2007/0096587 | A1 * | 5/2007 | Ionel et al. .................... 310/218 |

(Continued)

FOREIGN PATENT DOCUMENTS

| JP | 7-087714 A | 3/1995 |
| JP | 11-262202 A | 9/1999 |

(Continued)

OTHER PUBLICATIONS

International Search Report of PCT/JP2010/057597, mailing date Aug. 3, 2010.

*Primary Examiner* — Dang Le
(74) *Attorney, Agent, or Firm* — Westerman, Hattori, Daniels & Adrian, LLP (57) ABSTRACT

A laminated core 10 improves material yield and prevents cracks or breakages of core pieces by relaxing stress on connecting portions 13. A connected core segment 14 to be the laminated core 10 includes: a V-shaped cutout 17 located radially inward from the connecting portion 13, the cutout 17 opening in a radially inward direction with an opening angle of $360°/n$ given that n is a number of core segments 19; a slit 18 located radially outward from the connecting portion 13, the slit 18 dividing adjacent segment yokes 12 located radially outward from the connecting portion; a first through-hole 20 having a circular arc formed in a radially outward end of the cutout 17 in contact with the connecting portion 13; and a second through-hole 21 having a circular arc formed in a radially inward end of the slit 18 in contact with the connecting portion 13.

14 Claims, 12 Drawing Sheets

U.S. PATENT DOCUMENTS

| | | | |
|---|---|---|---|
| 2010/0090560 A1* | 4/2010 | Myojin | 310/216.043 |
| 2011/0169368 A1* | 7/2011 | Tsumagari | 310/216.009 |

FOREIGN PATENT DOCUMENTS

| | | |
|---|---|---|
| JP | 2000-341889 A | 12/2000 |
| JP | 2003-324870 A | 11/2003 |
| JP | 2005-160170 A | 6/2005 |
| JP | 2005-168128 A | 6/2005 |
| JP | 2007-228730 A | 9/2007 |
| JP | 2007-267585 A | 10/2007 |
| JP | 2008-289309 A | 11/2008 |
| WO | wo2008/139843 * | 11/2008 |

* cited by examiner

Radial Direction

PRIOR ART

FIG. 12(B)

PRIOR ART

LAMINATED CORE

TECHNICAL FIELD

The present invention relates to a laminated core, and more particularly to a so-called "bending core" and a so-called "winding core." In manufacture of the bending core, a straight laminated core is formed by laminating a predetermined number of the connected core segments, each of which includes segment yokes connected together by bendable connecting portions, and the straight laminated core is bent at the connecting portions in a ring shape. In manufacture of the winding core, a connected core segment, including segment yokes connected together by bendable connecting portions, is bent at the connecting portions and wound. In both of the cores, each of the segment yokes includes one magnetic pole piece, forming a yoke of the connected core segment. In this regard, the bending core is also referred to as "Poki-poki core" in Japanese ("Poki-poki" is a Japanese registered trademark), since each connecting portion is bent with a cracking sound of poki-poki when the straight laminated core is formed in the ring shape.

BACKGROUND ART

In the laminated core (motor core) referred to as the bending core, the connecting portions connecting adjacent laminated core segments are formed in an outermost area of the core, specifically, the yoke. However, when the connecting portions are bent to form the ring-shaped core, the connecting portions located in the outermost area of the yoke project further outward from an outer periphery of the core. The projected connecting portions interfere with a housing to decrease retention of the motor core or to cause a deformation of the motor core.

Figure 12A:
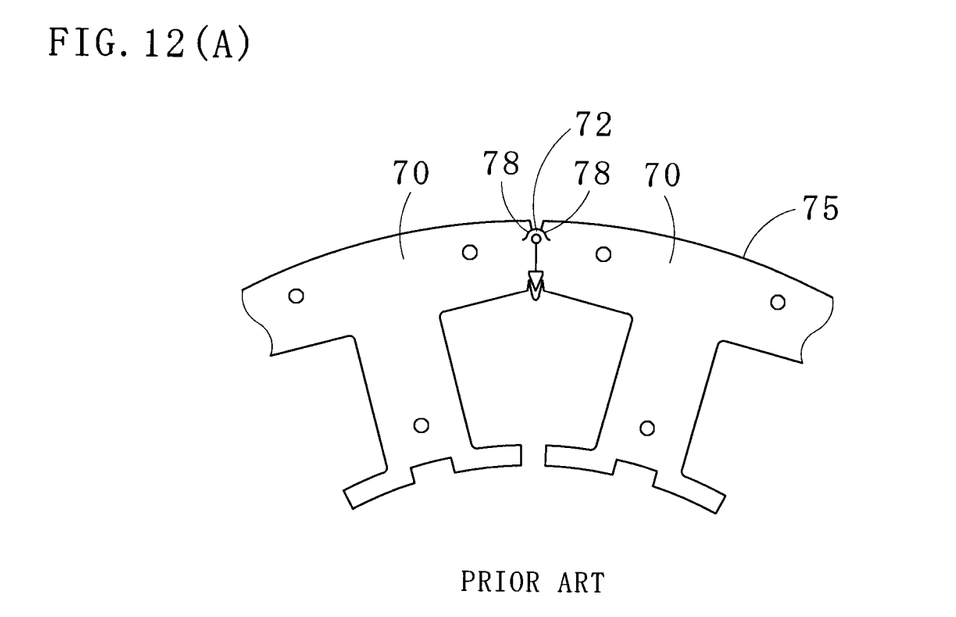
FIGS. 12(A) and 12(B) are explanatory diagrams of methods for manufacturing the laminated cores according to the conventional examples.
Figure 12B:
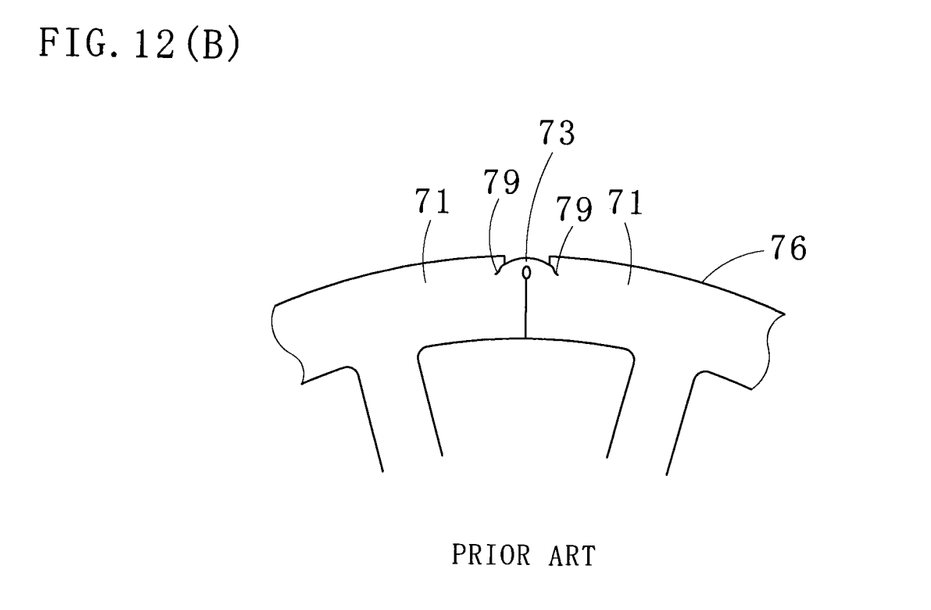

In light of the above problems, FIGS. 12 (A) and 12 (B) respectively disclose connecting portions 72 and 73 for connecting core segments 70 and 71. When being bent to form a ring-shaped core, the connecting portion 72 (73) is positioned slightly radially inward from an outer periphery 75 (76) of a yoke (see Patent Documents 1 and 2).

PRIOR ART DOCUMENTS

Patent Documents

Patent Document 1: Japanese Unexamined Patent Application Publication No. 11-262202
Patent Document 2: Japanese Unexamined Patent Application Publication No. 2005-160170

DISCLOSURE OF INVENTION

Problems to be Solved by the Invention

When the connecting portions 72 or 73 are bent to form the ring-shaped motor core of Patent Documents 1 or 2, stresses are concentrated on radially outward corners of the connecting portions 72 or 73. This stress concentration may create cracks or fractures (indicated by numerals 78 or 79) around these corners, causing adverse effects on quality of the motor core.

In addition, when the core segments connected by the connecting portions (i.e., the connected core segment) are formed in a straight shape, the connecting portions located closer to peripheral areas of the core segments increase an entire length of the connected core segment, which decreases material yield.

The present invention has been made in view of the above circumstances and has a first object to provide a laminated core that can reduce stress on connecting portions to prevent cracks or fractures of core segments, and a second object to provide a laminated core that achieves better material yield.

Means for Solving Problems

To accomplish the above objects, a first aspect of the present invention provides a laminated core formed with a predetermined number of straight connected core segments, each of the straight connected core segments having segment yokes connected together by bendable connecting portions, each of the segment yokes having a magnetic pole piece, the straight connected core segments laminated and bent at the connecting portions in a ring shape, the straight connected core segment comprising: a V-shaped cutout formed in a yoke located radially inward from the connecting portion, the V-shaped cutout opening in a radially inward direction with an opening angle of 360°/n given that n is a number of core segments in one connected core segment; a slit formed in the yoke located radially outward from the connecting portion, the slit dividing the adjacent segment yokes located radially outward from the connecting portion; a first through-hole having a circular arc formed in a radially outward end of the V-shaped cutout in contact with the connecting portion; and a second through-hole having a circular arc formed in a radially inward end of the slit in contact with the connecting portion, the second through-hole having a curvature radius larger than that of the first through-hole.

To accomplish the above objects, a second aspect of the present invention provides a laminated core formed with a strip of connected core segment, the strip of the connected core segment having segment yokes connected together by bendable connecting portions, each of the segment yokes having one or more magnetic pole pieces, the strip of connected core segment bent at the connecting portions and wound, the strip of connected core segment comprising: a V-shaped cutout formed in a radially inward section of the connecting portion, the V-shaped cutout opening in a radially inward direction with an opening angle of 360°/m given that m is a number of the segment yokes to form one loop of the laminated core; a slit formed in a radially outward section of the connecting portion, the slit dividing the adjacent segment yokes located radially outward from the connecting portion; a first through-hole having a circular arc formed in a radially outward end of the V-shaped cutout in contact with the connecting portion; and a second through-hole having a circular arc formed in a radially inward end of the slit in contact with the connecting portion, the second through-hole having a curvature radius larger than that of the first through-hole.

In the laminated core according to the first and second aspects of the present invention, it is preferable that the curvature radius of the second through-hole is 2 to 15 times a thickness of the connected core segment.

In the laminated core according to the first and second aspects of the present invention, it is preferable that the first through-hole and the second through-hole are a first circular hole and a second circular hole, respectively. Here, the circular holes may be partly cut out.

In the laminated core according to the first and second aspects of the present invention, it is preferable that radially inward and outward sides of the connecting portion respectively formed by the first and second through-holes are defined by the circular arcs facing in the same direction. This arrangement allows the connecting portion to be V-shaped or U-shaped.

Preferably, the width of the connecting portion defined by the first and second through-holes is uniform, but can have a margin of error of 0 to 20% of its minimum width. If the width of the connecting portion becomes more than 20% of the minimum width, stress is concentrated around the narrowest part when the connecting portion is bent, resulting in larger deformation in the thickness direction.

In the laminated core according to the first and second aspects of the present invention, it is possible that the circular arcs forming radially inward and outward sides of the connecting portion each have a center of a curvature radius placed radially inward from the connecting portion. It is also possible that the radially inward and outward sides of the connecting portion are straight lines defined by increasing the curvatures of the circular arcs. Thus, the width of the connecting portion becomes more precisely uniform.

In the laminated core according to the first and second aspects of the present invention, it is possible that the circular arcs forming the radially inward and outward sides of the connecting portion each have a center of a curvature radius located radially outward from the connecting portion.

In the laminated core according to the first and second aspects of the present invention, it is preferable that in the ring-shaped laminated core, a radially outward end of the connecting portion is located inward from an outermost end of the laminated core by a distance of 3% or more (more preferably, 5%, or 10% or more) of a radius of the laminated core.

In the laminated core according to the first and second aspects of the present invention, it is preferable that a bottom of the V-shaped cutout is located outward from a radially inward end of the segment yoke by a distance of more than 40% of a radial length of the segment yoke.

In the laminated core according to the first and second aspects of the present invention, it is possible that the slit is a V-shaped cutout or a U-shaped cutout.

Effect of the Invention

The laminated core according to the present invention has the following effects.

(1) The first aspect of the present invention provides the laminated core (bending core) formed with the predetermined number of the straight connected core segments, each of the straight connected core segments having the segment yokes connected together by the bendable connecting portions, each of the segment yokes having the magnetic pole piece, the straight connected core segments laminated and bent at the connecting portions in a ring shape. The second aspect of the present invention provides the laminated core (winding core) formed with the strip of the connected core segment, the strip of the connected core segment having the segment yokes connected together by the bendable connecting portions, each of the segment yokes having one or more of the magnetic pole pieces, the strip of the connected core segment bent at the connecting portions and wound. In the laminated cores according to the first and second aspects of the present invention, since the slit is formed via the second through-hole having the circular arc, the stress (tension) generated by bending the connecting portion is absorbed by the second through-hole, and extreme stress concentration is prevented. Thus, cracks and fractures are hardly generated around the connecting portion, ensuring the quality of the product, i.e., the laminated core.

(2) In the laminated cores according to the first and second aspects of the present invention, the radially inward section of the connecting portion includes the V-shaped cutout formed via the first through-hole having the circular arc, whereas the radially outward section of the connecting portion includes the slit formed via the second through-hole having the circular arc. Thus, it is easy to press and shear the V-shaped cutout and the slit, and the life of the cutting tool is ensured.

(3) In the laminated cores according to the first and second aspects of the present invention, if the connecting portion extending in the circumferential direction has a uniform or substantially uniform width in a longitudinal direction, the stress generated by bending the connecting portion is distributed, and thus the deformation of the connecting portion (e.g., a bulge in the thickness direction) due to the concentrated bending stress on one side of the connecting portion can be minimized.

(4) If the radially outward end of the connecting portion is located inward from the outermost end of the laminated core by the distance of 3% of more of the radius R, a gap between the blanked adjacent segment yoke pieces becomes smaller than that in the conventional laminated core. Thus, the material yield of the iron core piece can be improved.

(5) The bottom of the V-shaped cutout is located outward from a radially inward end of the segment yoke piece by the distance of more than 40% of the radial width of the segment yoke piece. With this structure, a contact area of the adjacent segment yoke pieces can be secured, preventing a deterioration of magnetic characteristics of the laminated core.

(6) If the slit is the V-shaped cutout or U-shaped cutout, the presswork becomes easier and the life of the cutting tool can be prolonged.

MODE FOR CARRYING OUT THE INVENTION

Figure 1:
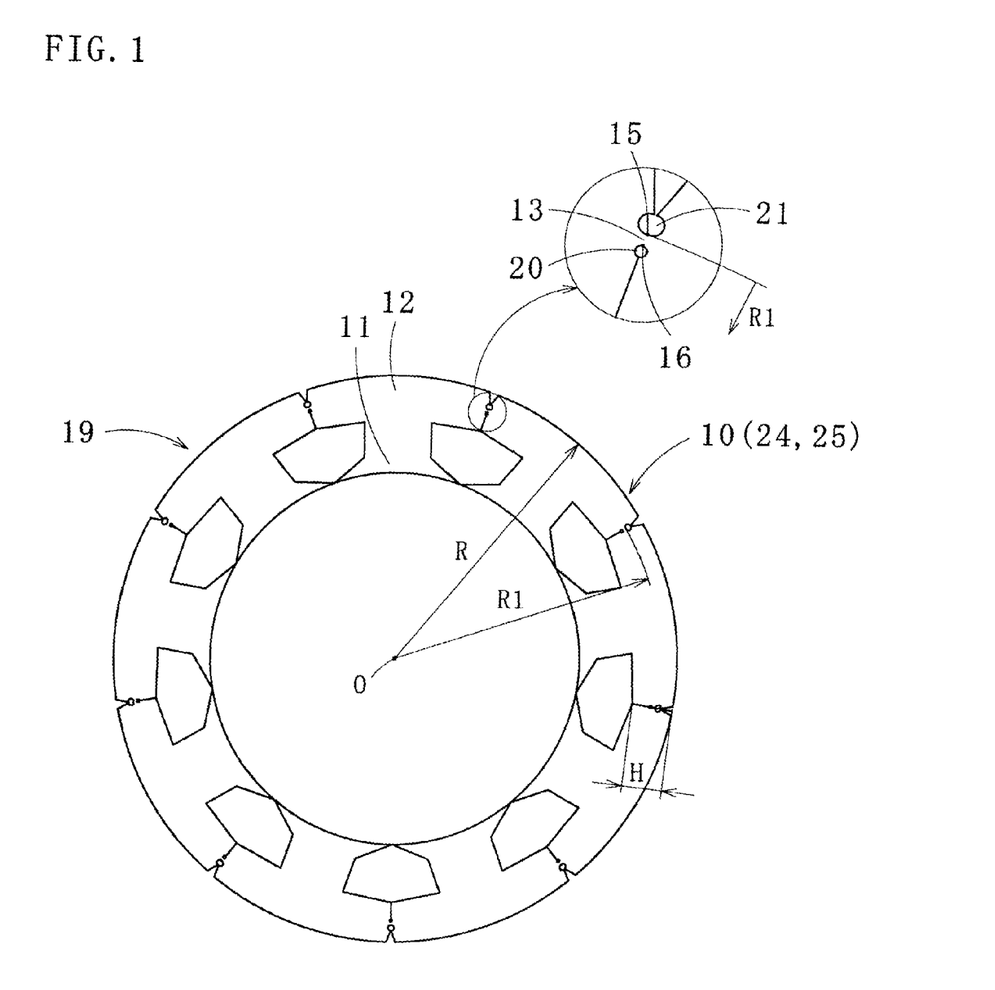
FIG. 1 is a plan view of a laminated core according to a first embodiment of the present invention.
Figure 2:
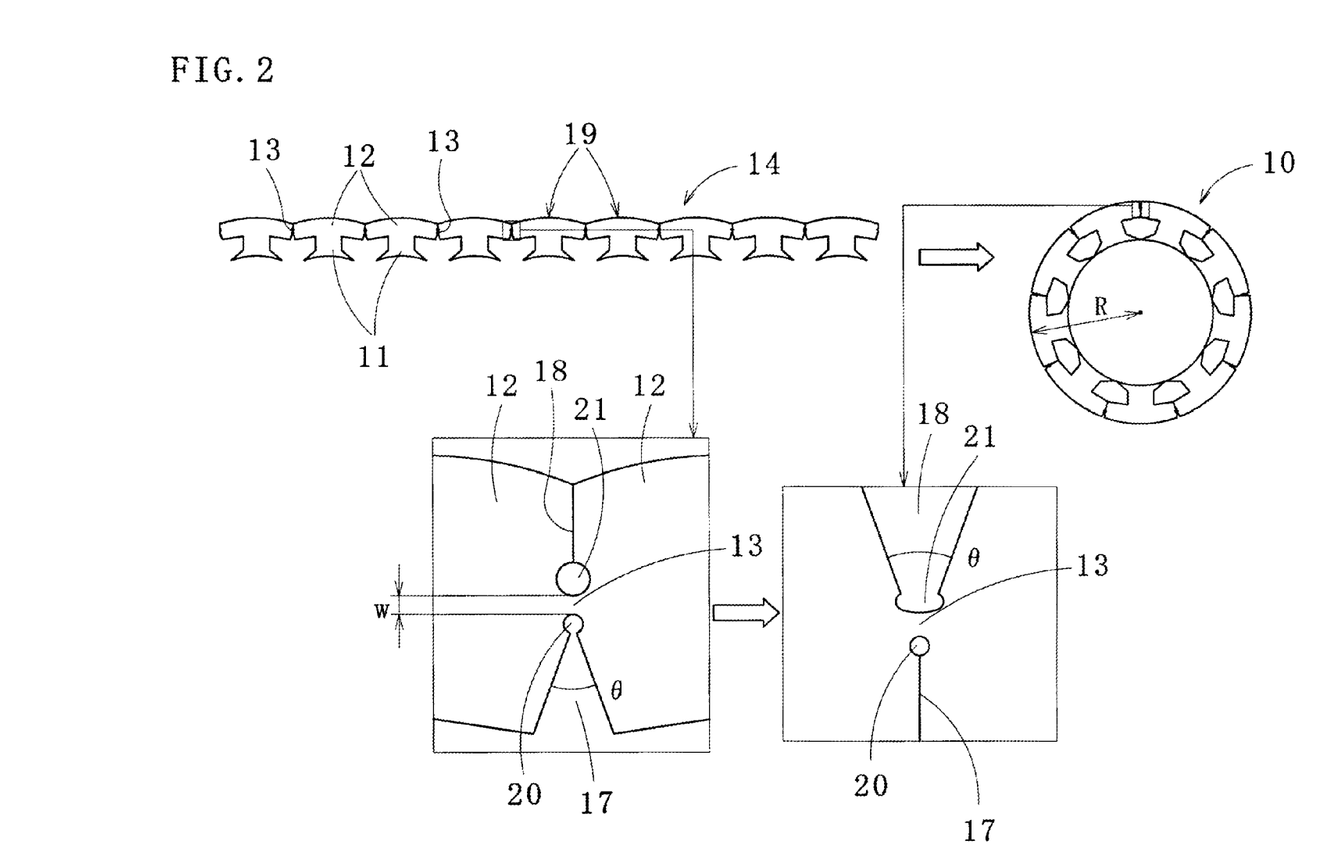
FIG. 2 is an explanatory diagram of a connected core segment used for manufacturing the laminated core.

FIG. 1 shows a laminated core 10 according to a first embodiment of the present invention. The laminated core 10 is a stator core for a motor. As shown in FIG. 2, a plurality of segment yokes 12 each having a magnetic pole piece 11 are linked together by bendable connecting portions 13, thereby forming a straight connected core segment 14. A predetermined number of the connected core segments 14 are laminated and bent at the connecting portions 13, thereby forming the laminated core 10.

As shown in FIGS. 1 and 2, a radially outward end 15 of the connecting portion 13 is located inward from an outer periphery of the segment yoke 12 by a distance of 3% or more (preferably 5% or more, further preferably 10% or more) of a radius R of the laminated core 10. A radially inward end 16 of the connecting portion 13 is located outward from an inner end of the segment yoke 12 by a distance of more than 40% (preferably 50% or more) of a width H of the segment yoke 12. It is preferable that a width w of the connecting portion 13 is, for example, within 0.3 to 1% of the radius R of the laminated core 10 (or within one to five times a material thickness).

In manufacture of the laminated core 10, for example, a long straight material is punched (blanked) to form the connected core segment 14, as shown in FIG. 2.

A radially inward section of the connecting portion 13 between the segment yokes 12 in the connected core segment 14 includes a V-shaped cutout 17 with an opening angle θ. A radially outward section of connecting portion 13 includes a slit 18. The slit 18 separates the adjacent segment yokes 12 located radially outward from the connecting portion 13. The opening angle θ is 360°/n, where n is the number of magnetic poles in the laminated core 10, i.e., the number of core segments 19 in the connected core segment 14.

A bottom (i.e., radially outward section) of the V-shaped cutout 17 in the straight connected core segment 14 includes a first circular hole, which is one example of a first through-hole 20 having a circular arc in contact with the connecting portion 13. A radially inward section of the slit 18 includes a second circular hole, which is one example of a second through-hole 21 having a circular arc in contact with the connecting portion 13.

The predetermined number of the connected core segments 14 are laminated and bent at the connecting portions 13, thereby forming a ring shape as a whole, i.e., the laminated core 10. In this case, the slit 18 is opened with the opening angle θ, whereas the V-shaped cutout 17 is closed (one side of the V-shaped cutout 17 comes in contact with the other side). Accordingly, the slit 18 becomes a V-shaped cutout with the opening angle θ.

The laminated core 10 can be made with less material because the connecting portion 13 is located inward from an outermost end of the laminated core 10 by the distance of 3% or more of the radius R. The reason for this will be explained referring to FIGS. 3 and 4.

Figure 3:
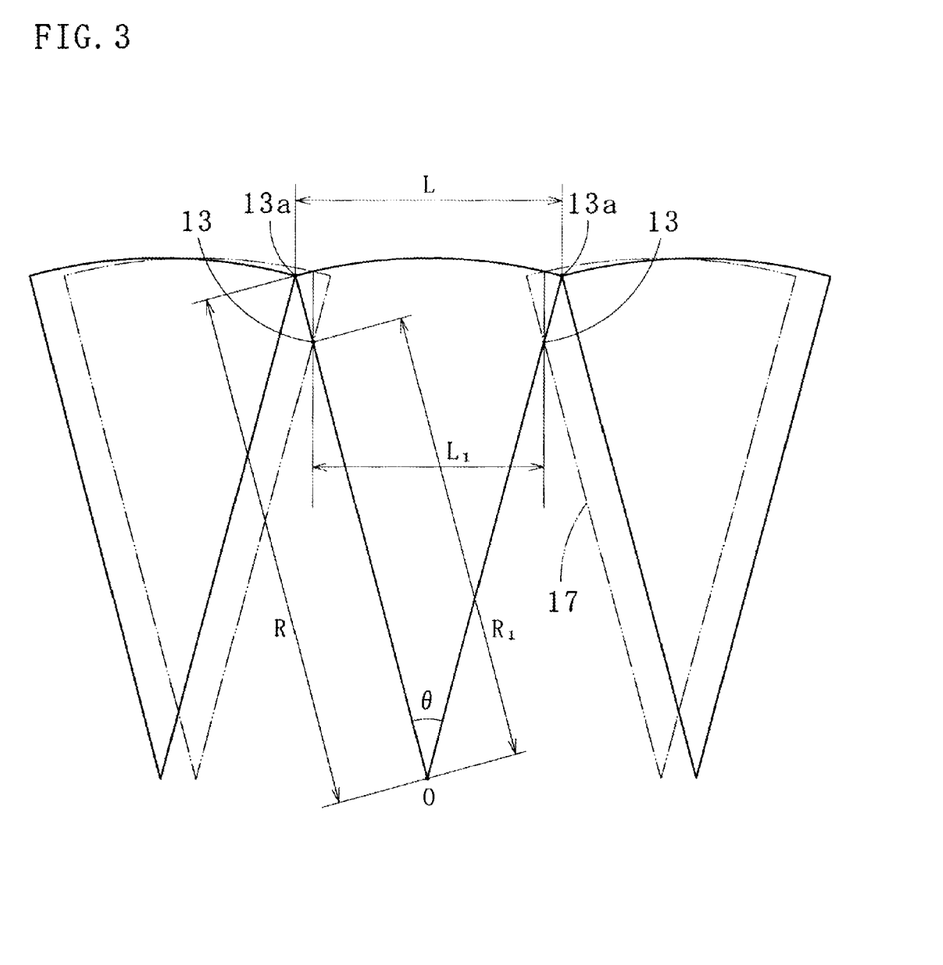
FIG. 3 is a pattern diagram to show material yield of the laminated core.
Figure 4:
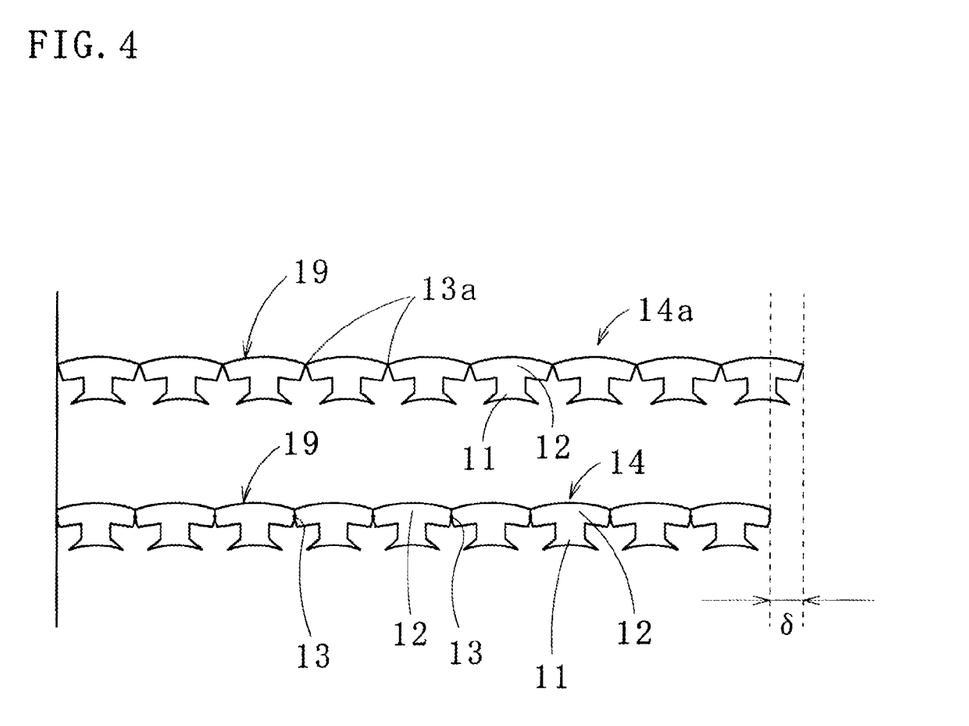
FIG. 4 is an explanatory diagram showing layouts of the connected core segments according to the present invention and the conventional example, respectively.

As shown in FIGS. 3 and 4 schematically, if a connecting portion 13a is located at the outermost end of the laminated core 10 (i.e., the core segment 19) and a width of the connecting portion 13a is not taken into account, a gap L between the adjacent core segments 19 in a connected core segment 14a is 2R·sin (360°/2n). If the connecting portion 13 is located at a radially inward section of the laminated core 10 and a radial position of the connecting portion 13 is R1 (<R), a gap L1 between the adjacent core segments 19 is 2R1·sin (360°/2n) (<L).

As shown in FIG. 4, the connected core segment 14 including the connecting portion 13 at the radially inward section is shorter than the connected core segment 14a by a length δ, improving material yield. A reduction rate of the material is expressed in a formula: (L−L1)/L×100%. Given that a distance from an outermost periphery of a motor core (the laminated core 10) to the connecting portion 13 is h, then the reduction rate is expressed in a formula: h/R×100%. Thus, the reduction rate depends on the radial position of the connecting portion 13.

The radially inward and outward sections of the connecting portion 13 before being bent include the first and second through-holes 20 and 21, respectively. The first and second through-holes 20 and 21 are circular holes. A diameter of the second through-hole 21 made of the circular hole is two to five times that of the first through-hole 20 made of the circular hole. Accordingly, a curvature radius r2 of the circular arc formed at the radially outward section of the connecting portion 13 is sufficiently larger than a curvature radius r1 of the circular arc formed at the radially inward section of the connecting portion 13.

The curvature radius r2 is larger than the curvature radius r1 of the circular arc formed at the radially inward section of the connecting portion 13 (e.g., 2 to 15 times a thickness of the connected core segment 14), which prevents cracks or splits easily created in the radially outward section of the connecting portion 13 when the connecting portion 13 is bent. The curvature radius r2 exceeding 15 times the thickness of the connected core segment 14 is not favorable because magnetic paths of the yoke piece become significantly narrow, reducing the performance of the motor core.

The first and second through-holes 20 and 21 (e.g., circular holes) are respectively formed in the bottom of the V-shaped cutout 17 and the radially inward end of the slit 18. This structure makes it easy to produce a cutting tool for presswork and eliminates a need for a sharp end of the cutting tool, thereby prolonging life of the cutting tool.

The first and second through-holes 20 and 21 need to have the circular arcs in contact with the connecting portion 13. However, the shape of the through-hole is not limited to a circle, but can be, for example, an ellipse, an oval, or a fan-like shape.

Figure 5:
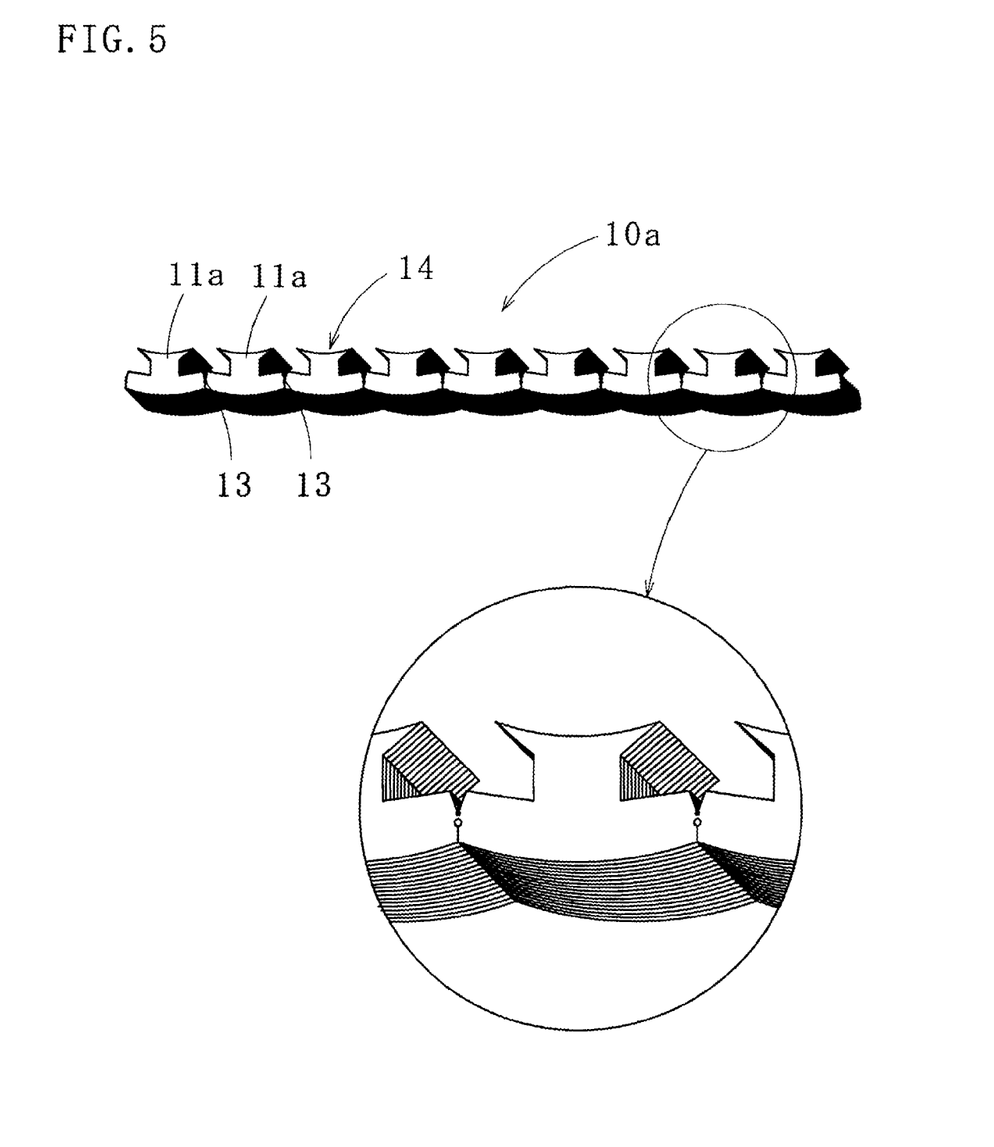
FIG. 5 is a perspective view of the straight laminated core before being bent.

FIG. 5 shows a laminated connected core segment 10a formed by laminating and interlocking (caulking) the above-described connected core segments 14. To form the laminated core 10 in FIG. 1, a wire is wound around each magnetic pole section 11a and the laminated connected core segment 10a is bent at the connecting portions 13.

Next, referring to FIGS. 1, 6(A), and 6(B), descriptions will be given on differences between laminated cores 24, 25 according to second and third embodiments of the present invention and the laminated core 10 according to the first embodiment of the present invention in FIGS. 1 to 5.

In the laminated core 24 according to the second embodiment of the present invention, adjacent segment yokes 27 and 28 of a connected core segment in use are connected by a connecting portion 29, and instead of the above-described slit, a V-shaped cutout 30 is formed in a radially outward section of the connecting portion 29. Here, if an opening angle of the V-shaped cutout 30 is θ1 (e.g., 5 to 30 degrees) and the opening angle of the V-shaped cutout 17 formed inward from the connecting portion 29 is θ, the opening angle of the V-shaped cutout 30 in the laminated core 24 is (θ1+θ).

Based on the above conditions, a circular hole 31 (one example of the second through-hole) is formed, and then the slit (the V-shaped cutout 30) is formed such that the circular hole 31 is placed at a bottom (radially inward section) of the V-shaped cutout. This structure makes the presswork easy and prolongs the life of the cutting tool.

Figure 6A:
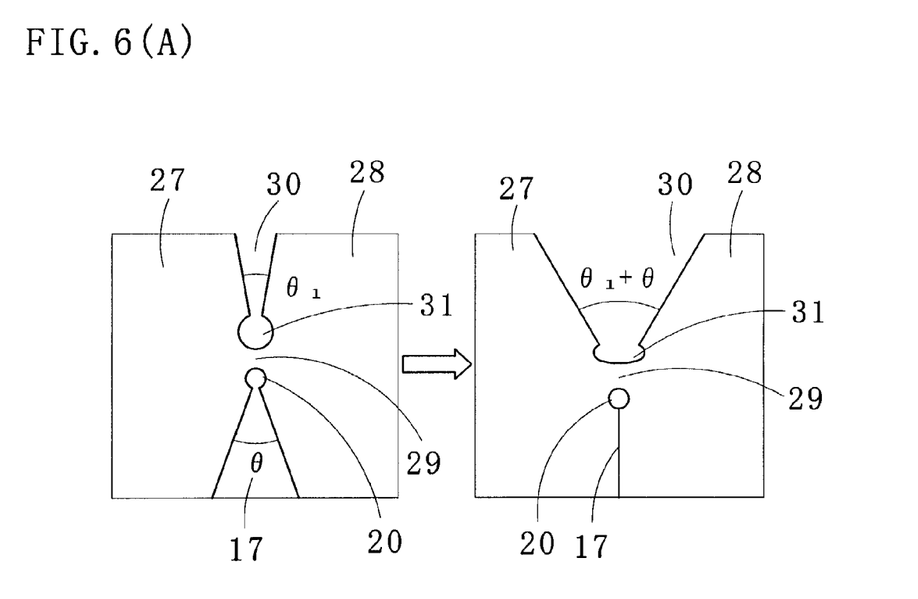
FIG. 6(A) is an explanatory diagram of a laminated core according to a second embodiment of the present invention.
Figure 6B:
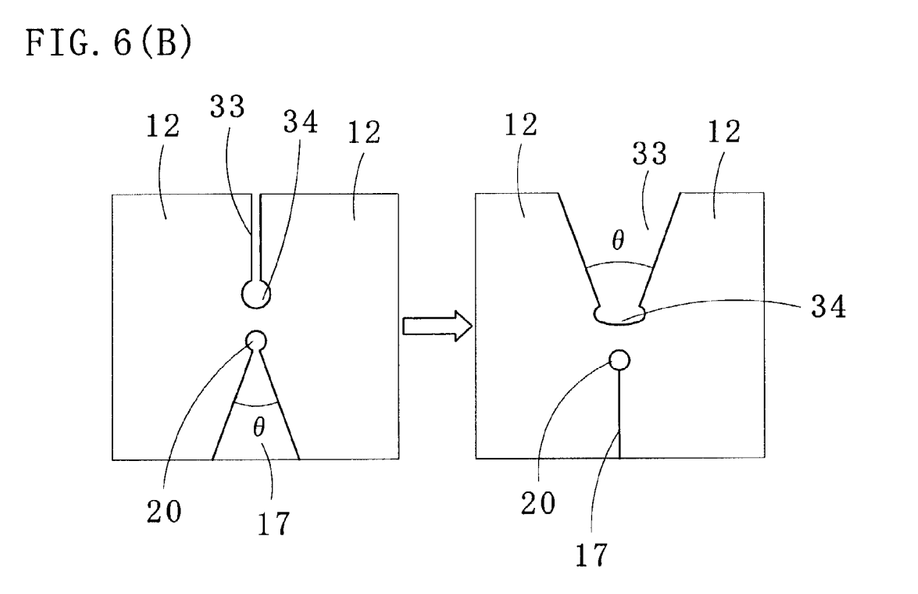
FIG. 6(B) is an explanatory diagram of a laminated core according to a third embodiment of the present invention.

The laminated core 25 according to the third embodiment of the present invention in FIGS. 1 and 6(B) is the same as the laminated core 10 according to the first embodiment of the present invention, except that the laminated core 25 includes slits 33 having a constant width (e.g., 0.3 to 2 mm, or one to five times the material thickness). A bottom of the slit 33 includes a circular hole (including a true circle, an ellipse, or an oval) 34, which is one example of the second through-hole.

If a width (diameter) of the circular hole 34 is the same as that of the slit 33, the slit 33 becomes a U-shaped cutout. In this case, it is preferable that the width of the slit 33 is set as small as possible. Based on the above conditions, the circular hole 34 is formed, and then the slit 33 is formed such that the circular hole 34 is placed at a bottom (radially inward section) of the slit 33. This structure makes the presswork easy and prolongs the life of the cutting tool.

Figure 7:
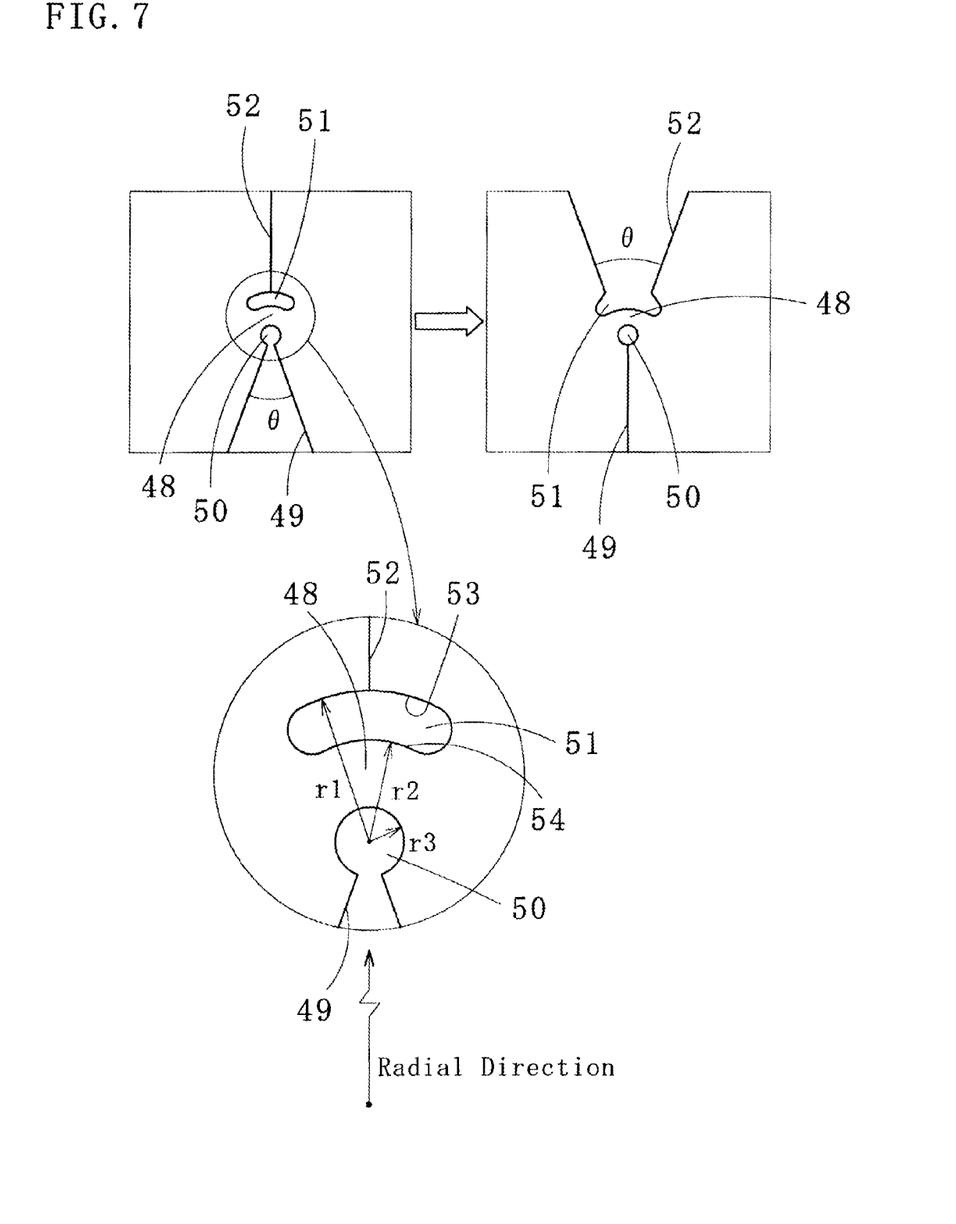
FIG. 7 is an explanatory diagram of a laminated core according to a fourth embodiment of the present invention.

In a laminated core according to a fourth embodiment of the present invention in FIG. 7, a radially inward section of a connecting portion 48 includes a V-shaped cutout 49, and a radially outward end of the V-shaped cutout 49 includes a first through-hole 50 made of a circular hole. Further, a radially outward section of the connecting portion 48 includes a second through-hole 51 made of a curved hole, and a radially outward section of the second through-hole 51 includes a slit 52.

Radial ends of the second through-hole 51 are formed by an outer circle 53 and an inner circle 54. Curvature radii r1, r2, and r3 of the outer circle 53, the inner circle 54, and the first through-hole 50 have a center at the same position as a center of the first through-hole 50, therefore the connecting portion 48 has a uniform width in a circumferential direction. For this reason, if the connecting portion 48 is bent (curved), a bending stress is equally applied in the circumferential direction of the connecting portion 48. As a result, load is dispersed (balanced), reducing the uneven stress on the connecting portion 48.

In the fourth embodiment, the center of the curvature radius r1 of the outer circle 53 is arranged at the same position as that of the first through-hole 50, but this arrangement is not essential. The center of the inner circle 54 of the second through-hole 51 may be placed in a different position from that of the first through-hole 50 to some extent. In this case, the width of the connecting portion 48 is preferably uniform, but can have a margin of error of 0 to 20% of its minimum width. (The same can be said to fifth and sixth embodiments to be described below.) In other words, a circular arc of the inner circle 54 of the second through-hole 51 and a circular arc of the first through-hole 50, both forming the connecting portion 48, face in the same direction (i.e., a radially outward direction). Thus, substantially uniform load is applied on the connecting portion 48, and a deformation (strain) of the connecting portion 48 does not affect the manufacture of the laminated core.

Figure 8:
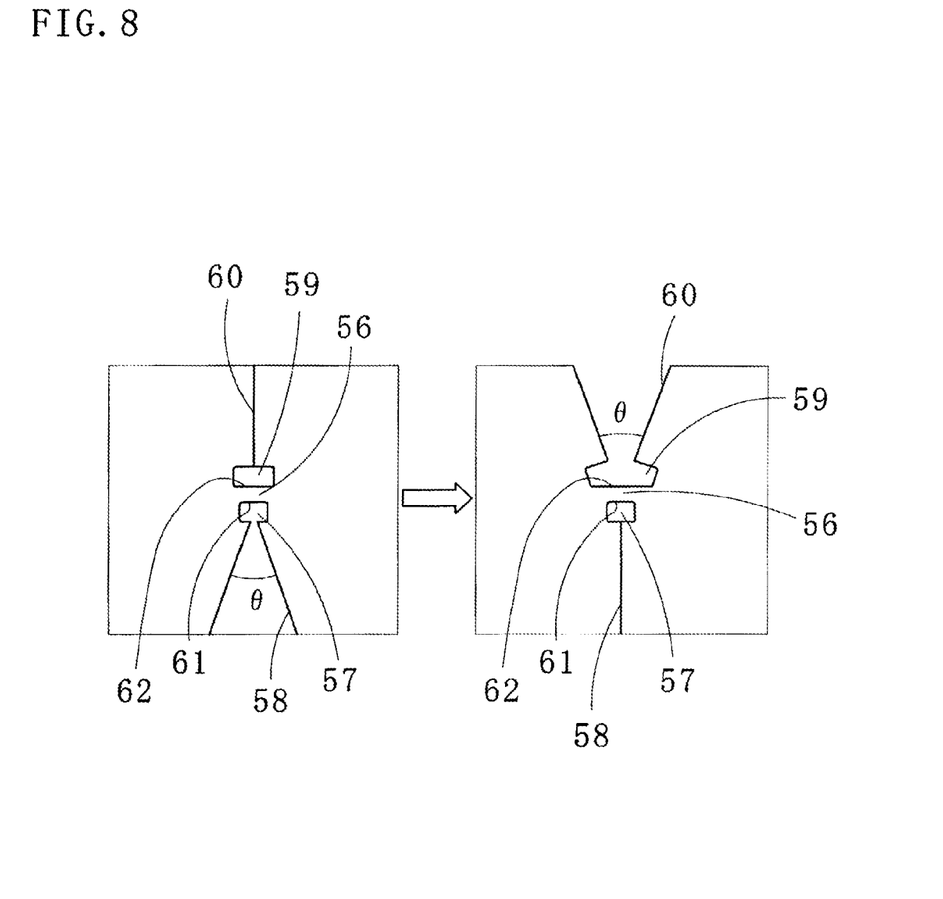
FIG. 8 is an explanatory diagram of a laminated core according to a fifth embodiment of the present invention.

Referring to FIG. 8, descriptions will be given on a connecting portion 56 of a laminated core according to a fifth embodiment of the present invention. As shown in FIG. 8, a radially inward section of the connecting portion 56 includes a V-shaped cutout 58 formed via a first through-hole 57, and a radially outward section of the connecting portion 56 includes a slit 60 formed via a second through-hole 59.

The first and second through-holes 57 and 59 are made of rectangular cutouts having long sides in a direction perpendicular to the radial direction. Punching lines 61 and 62 of the radially inward and outward ends of the connecting portion 56 are parallel straight lines (i.e., curvature radii of circular arcs of the first and second through-holes are increased, for example, to infinity). Thus, the connecting portion 56 has a uniform width in a circumferential direction (i.e., the direction perpendicular to the radial direction).

When the connecting portion 56 is bent, the slit 60 opens in V-shape, whereas the V-shaped cutout 58 closes. In this case, the connecting portion 56 is bent to some degree, but the uniform width in the radial direction can equally distributes load, reducing deformations in a material thickness direction.

Figure 9:
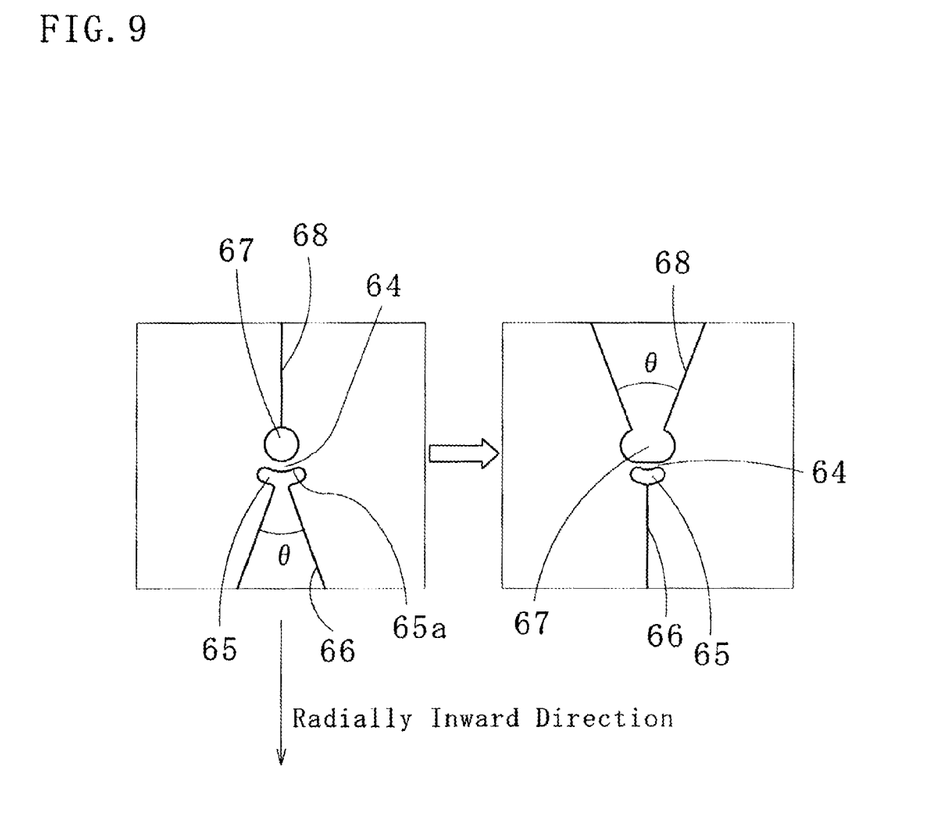
FIG. 9 is an explanatory diagram of a laminated core according to a sixth embodiment of the present invention.

Referring to FIG. 9, descriptions will be given on a connecting portion 64 of a laminated core according to a sixth embodiment of the present invention. A radially inward section of the connecting portion 64 includes a V-shaped cutout 66 formed via a first through-hole 65, and a radially outward section of the connecting portion 64 includes a slit 68 formed via a second through-hole 67. The second through-hole 67 is a circular hole. A radially outward section of the first through-hole 65 includes a circular arc 65a, which forms a radially inward end of the connecting portion 64. A center of curvature radius of the circular arc 65a is placed radially outward from the connecting portion 64. In this embodiment, the circular arcs of the first and second through-holes 65 and 67, forming radially inward and outward ends of the connecting portion 64, face in the same direction (the radially inward direction). In this regard, FIG. 7 shows the case that the circular arcs, forming the inward and outward ends of the connecting portion 48, face in the radially outward direction.

In this embodiment, the center of the curvature radius of the circular arc 65a and a center of the second through-hole 67 are arranged in approximately the same position, and thus the connecting portion 64 has approximately constant radial width. For this reason, when the connecting portion 64 is bent, uneven bending load is not applied to the connecting portion 64, reducing deformations or strains in the material thickness direction.

Figure 10:
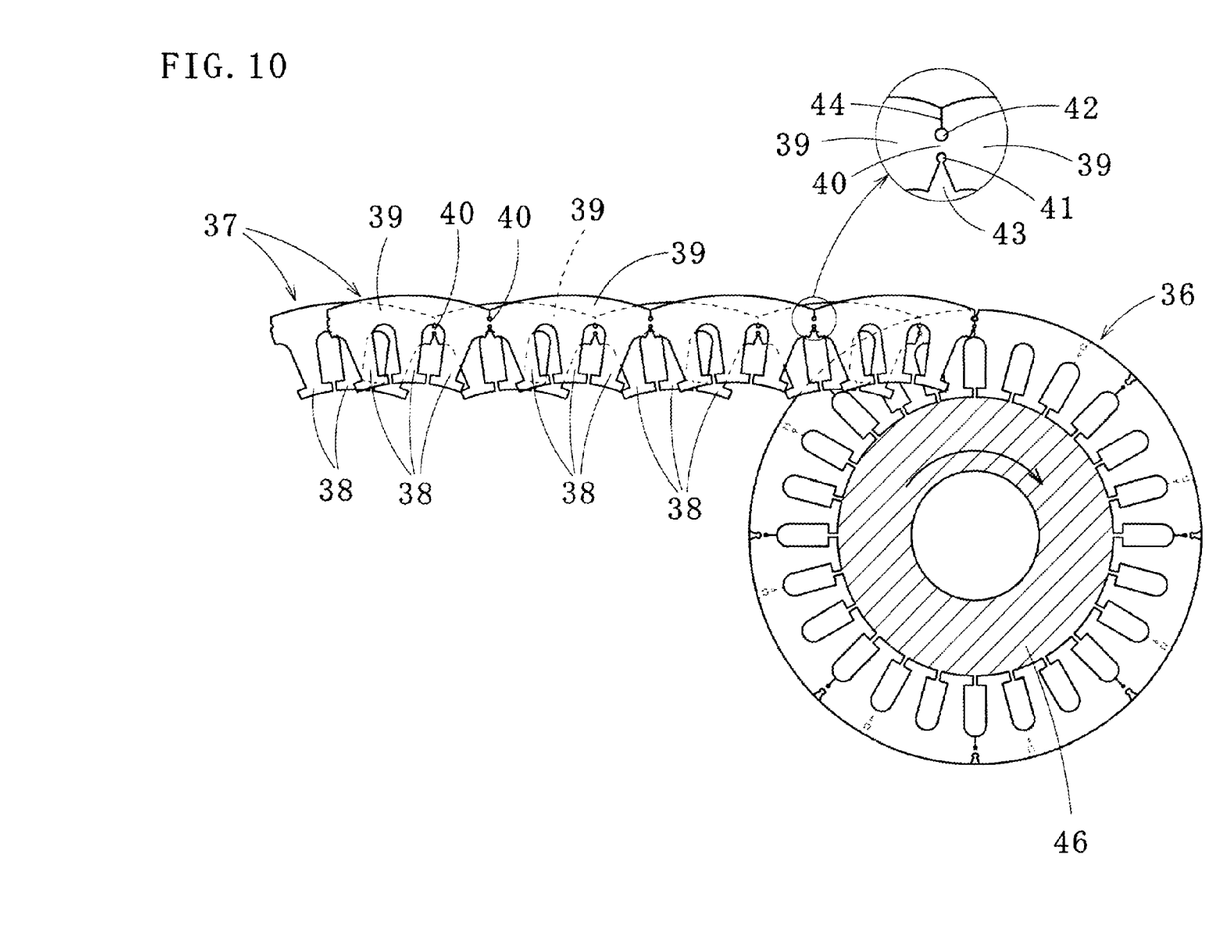
FIG. 10 is an explanatory diagram of a laminated core according to a seventh embodiment of the present invention.

Referring to FIG. 10, a laminated core 36 according to a seventh embodiment of the present invention will be explained. In this embodiment, segment yokes 39 including a plurality of (three, in this embodiment) magnetic pole pieces 38 are connected via connecting portions 40, thereby forming a connected core segment 37. This band-shaped connected core segment 37 is bent at the connecting portions 40 in a spiral form, thereby forming the ring-shaped laminated core 36. Also in this embodiment, two sheets of these connected core segments 37 are prepared, and the positions of the connecting portions 40 of the connected core segments 37 are shifted by one magnetic pole piece. Hereinafter, descriptions will be given on one connected core segment 37, but the other connected core segment 37 to be placed thereunder has the same configuration.

In the laminated core 36, a radially outermost side of the connecting portion 40 is located inward from an outer periphery of the laminated core 36 by a distance of 3% or more of a radius R of the laminated core 36. A radially innermost side of the connecting portion 40 (i.e., a bottom of a V-shaped cutout 43) is located outward from an inner side of a yoke section (specifically, the segment yoke 39) by a distance of more than 40% of a radial width of the yoke section. In view of strength and flexibility of the connecting portion 40, it is preferable that the width of the connecting portion 40 is within one to five times the thickness of the core segment. As described above, the connecting portion 40 placed in the radially inward section can improve the material yield.

The connected core segment 37 used for manufacturing the laminated core 36, as shown in the partial enlarged view of FIG. 10, includes first and second through-holes 41 and 42 made of circular holes. The first and second through-holes 41 and 42 are placed in radially inward and outward sections of the connecting portion 40, respectively. The first and second through-holes 41 and 42 need to include circular arcs in contact with the connecting portion 40. However, the shape of the through-hole is not limited to a circle, but can be, for example, an ellipse, an oval, or a fan-like shape. Further, a radially inward section of the first through-hole 41 includes the V-shaped cutout 43, and a radially outward section of the second through-hole 42 includes a slit 44. An opening angle θ of the V-shaped cutout 43 is equal to 360°/m, where m is the number of the segment yokes 39 required to form a loop of the laminated core 36. A numeral 46 indicates a winding shaft.

A curvature radius of the second through-hole 42 in contact with the connecting portion 40 is 2 to 15 times (more preferably, two to five times) that of the first through-hole 41. This decreases cracks or breaks generated by bending the connecting portion 40. Additionally, by providing the first and second through-holes 41 and 42, the V-shaped cutout 43 and the slit 44 can be easily formed.

In this embodiment, the number of the magnetic pole pieces 38 for one segment yoke 39 is three, but can be one, two, or four or more. The laminated core 36 is formed by laminating and bending two sheets of the connected core segments 37. However, the laminated core 36 may be formed by winding one connected core segment 37, or three or more of the connected core segments 37 in a ring shape such that the connecting portions thereof are displaced each other (not vertically aligned with each other).

In the above-described embodiments, specific figures and actual numbers are used, but those can be changed without departing from the spirit and scope of the present invention. Further, abutting portions (adjoining portions) of the adjacent segment yokes may include a depressed portion (e.g., a semicircular depressed portion) and a projecting portion (a semicircular projecting portion), respectively.

In the laminated core according to the seventh embodiment, when the laminated core includes the first through-hole (e.g., a circular hole) having the circular arc at the radially inward section in contact with the connecting portion 40, the slit 44 may be a parallel cutout (specifically, an U-shaped cutout) as shown in FIG. 6(B), or a V-shaped cutout as shown in FIG. 6(A). Those modifications are applicable to all of the embodiments.

With the connecting portions of the laminated cores according to the first to sixth embodiments, the adjacent segment yokes may be connected in a bendable manner.

Figure 11:
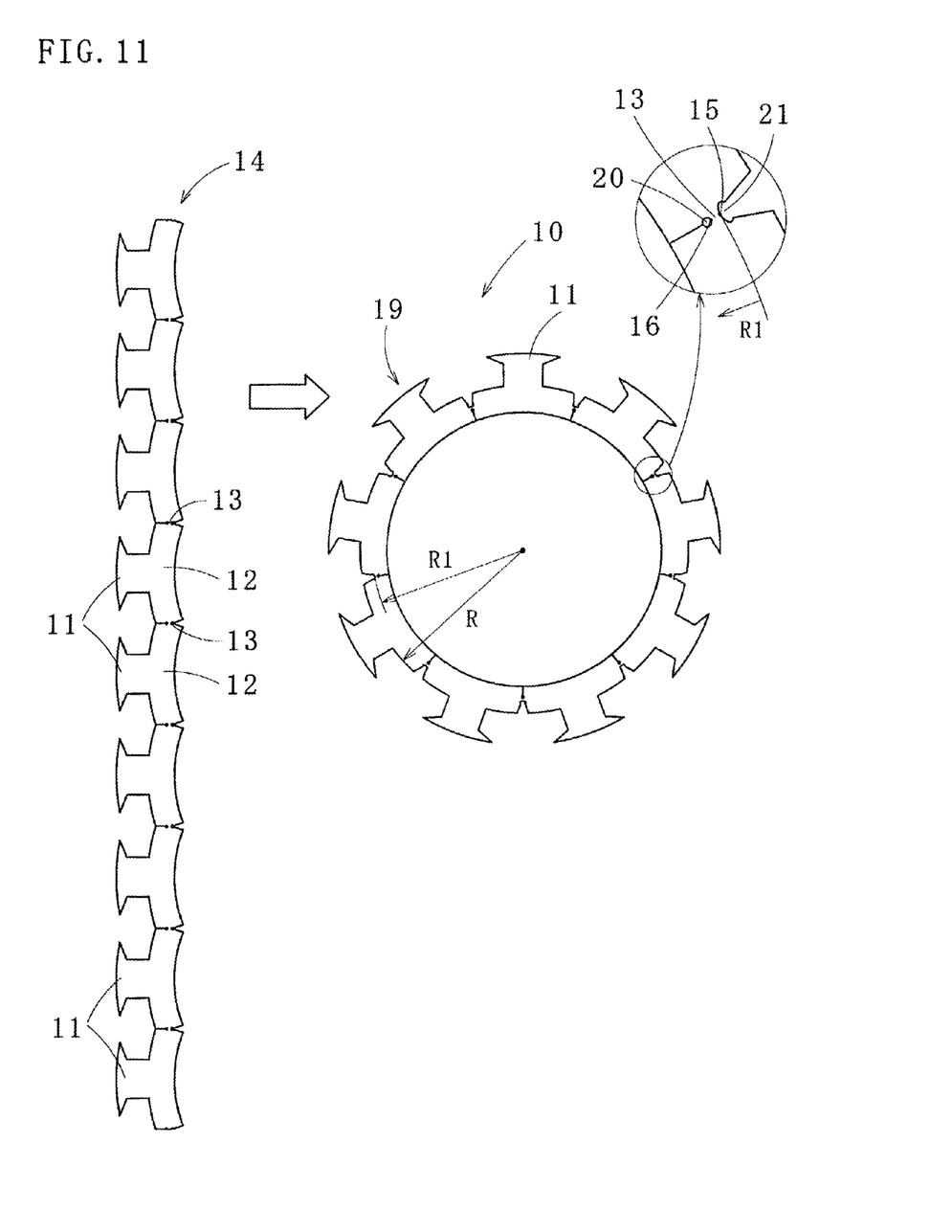
FIG. 11 is an explanatory diagram of a laminated core according to the other embodiments of the present invention.

In the laminated cores according to the first to seventh embodiments of the present invention, the magnetic pole pieces face in the radially inward direction, but may face in the radially outward direction as the magnetic pole pieces 11 in FIG. 11. FIG. 11 uses the same numerals as the laminated core and the core pieces in FIG. 1, and thus a detail description therefor is omitted.

In the laminated cores according to the above-described embodiments, the circular arcs formed at the radially inward and outward sections of the connecting portions may have the same curvature radius.

DESCRIPTION OF NUMERALS

10: laminated core; 10a: laminated connected core segment; 11: magnetic pole piece; 11a: magnetic pole section; 12: segment yoke; 13, 13a: connecting portion; 14, 14a: connected core segment; 15: radially outward end; 16: radially inward end; 17: V-shaped cutout; 18: slit; 19: core segment; 20: first through-hole; 21: second through-hole; 24, 25: laminated core; 27, 28: segment yoke; 29: connecting portion; 30: V-shaped cutout; 31: circular hole; 33: slit; 34: circular hole; 36: laminated core; 37: connected core segment; 38: magnetic pole piece; 39: segment yoke; 40: connecting portion; 41: first through-hole; 42: second through-hole; 43: V-shaped cutout; 44: slit; 46: winding shaft; 48: connecting portion; 49: V-shaped cutout; 50: first through-hole; 51: second through-hole; 53: outer circle; 54: inner circle; 56: connecting portion; 57: first through-hole; 58: V-shaped cutout; 59: second through-hole; 60: slit; 61, 62: punching line; 64: connecting portion; 65: first through-hole; 65a: circular arc; 66: V-shaped cutout; 67: second through-hole; 68: slit

The invention claimed is:

1. A laminated core formed with a predetermined number of straight connected core segments, each of the straight connected core segments having segment yokes connected together by bendable connecting portions, each of the segment yokes having a magnetic pole piece, the straight connected core segments laminated and bent at the connecting portions in a ring shape, the straight connected core segment comprising:
   a V-shaped cutout formed in a yoke located radially inward from the connecting portion, the V-shaped cutout opening in a radially inward direction with an opening angle of 360°/n given that n is a number of core segments in one connected core segment;
   a slit formed in the yoke located radially outward from the connecting portion, the slit dividing the adjacent segment yokes located radially outward from the connecting portion;
   a first through-hole having a circular arc formed in a radially outward end of the V-shaped cutout in contact with the connecting portion; and
   a second through-hole having a circular arc formed in a radially inward end of the slit in contact with the connecting portion, wherein
   the radially outward end of the connecting portion is located inward from an outermost end of the laminated core by a distance of 5% or more of a radius of the laminated core;
   a bottom of the V-shaped cutout is located outward from a radially inward end of the segment yoke by a distance of more than 40% of a radial length of the segment yoke;
   a radial width of the connecting portion is 1 to 5 times a thickness of the connecting portion; and
   the second through-hole having a curvature radius larger than that of the first through-hole.

2. The laminated core as defined in claim 1, wherein the curvature radius of the second through-hole is 2 to 15 times a thickness of the connected core segment.

3. The laminated core as defined in claim 1, wherein the first through-hole and the second through-hole are a first circular hole and a second circular hole, respectively.

4. The laminated core as defined in claim 1, wherein radially inward and outward sides of the connecting portion respectively formed by the first and second through-holes are defined by the circular arcs facing in the same direction.

5. The laminated core as defined in claim 4, wherein the circular arcs forming radially inward and outward sides of the connecting portion each have a center of a curvature radius placed radially inward from the connecting portion.

6. The laminated core as defined in claim 4, wherein the circular arcs forming the radially inward and outward sides of the connecting portion each have a center of a curvature radius located radially outward from the connecting portion.

7. The laminated core as defined in claim 1, wherein the slit is a V-shaped cutout or a U-shaped cutout.

8. A laminated core formed with a strip of connected core segment, the strip of the connected core segment having segment yokes connected together by bendable connecting portions, each of the segment yokes having one or more magnetic pole pieces, the strip of connected core segment bent at the connecting portions and wound in a spiral form, the strip of connected core segment comprising:

a V-shaped cutout formed in a radially inward section of the connecting portion, the V-shaped cutout opening in a radially inward direction with an opening angle of 360°/m given that m is a number of the segment yokes to form one loop of the laminated core;

a slit formed in a radially outward section of the connecting portion, the slit dividing the adjacent segment yokes located radially outward from the connecting portion;

a first through-hole having a circular arc formed in a radially outward end of the V-shaped cutout in contact with the connecting portion; and a second through-hole having a circular arc formed in a radially inward end of the slit in contact with the connecting portion, wherein the radially outward end of the connecting portion is located inward from an outermost end of the laminated core by a distance of 5% or more of a radius of the laminated core;

a bottom of the V-shaped cutout is located outward from a radially inward end of the segment yoke by a distance of more than 40% of a radial length of the segment yoke;

a radial width of the connecting portion is 1 to 5 times a thickness of the connecting portion; and the second through-hole having a curvature radius larger than that of the first through-hole.

9. The laminated core as defined in claim 8, wherein the curvature radius of the second through-hole is 2 to 15 times a thickness of the connected core segment.

10. The laminated core as defined in claim 8, wherein the first through-hole and the second through-hole are a first circular hole and a second circular hole, respectively.

11. The laminated core as defined in claim 8, wherein radially inward and outward sides of the connecting portion respectively formed by the first and second through-holes are defined by the circular arcs facing in the same direction.

12. The laminated core as defined in claim 11, wherein the circular arcs forming radially inward and outward sides of the connecting portion each have a center of a curvature radius placed radially inward from the connecting portion.

13. The laminated core as defined in claim 11, wherein the circular arcs forming the radially inward and outward sides of the connecting portion each have a center of a curvature radius located radially outward from the connecting portion.

14. The laminated core as defined in claim 8, wherein the slit is a V-shaped cutout or a U-shaped cutout.

* * * * *